United States Patent
Kim et al.

(10) Patent No.: US 11,792,269 B2
(45) Date of Patent: Oct. 17, 2023

(54) METHOD FOR GENERATING APPLICATION FOR CONTROLLING EXTERNAL ELECTRONIC DEVICE AND ELECTRONIC APPARATUS FOR SUPPORTING THE SAME

(71) Applicant: Samsung Electronics Co., Ltd., Suwon-si (KR)

(72) Inventors: Kwanghyuk Kim, Suwon-si (KR); Jeesun Kim, Suwon-si (KR); Taesoo Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 17/298,515

(22) PCT Filed: May 17, 2021

(86) PCT No.: PCT/KR2021/006167
§ 371 (c)(1),
(2) Date: May 28, 2021

(87) PCT Pub. No.: WO2022/163948
PCT Pub. Date: Aug. 4, 2022

(65) Prior Publication Data
US 2023/0136504 A1    May 4, 2023

(30) Foreign Application Priority Data

Jan. 28, 2021    (KR) .......................... 10-2021-0012091

(51) Int. Cl.
*H04L 67/125*    (2022.01)
*G06F 9/451*    (2018.01)

(52) U.S. Cl.
CPC ............ *H04L 67/125* (2013.01); *G06F 9/451* (2018.02)

(58) Field of Classification Search
CPC .............................. H04L 67/125; G06F 9/451
(Continued)

(56) References Cited

U.S. PATENT DOCUMENTS

| 2014/0073244 A1 | 3/2014 | Ko et al. |
| 2014/0137100 A1 | 5/2014 | Won et al. |

(Continued)

FOREIGN PATENT DOCUMENTS

| KR | 10-2014-0033677 A | 3/2014 |
| KR | 10-2014-0061002 A | 5/2014 |

(Continued)

*Primary Examiner* — Frantz B Jean

(57) ABSTRACT

An electronic device includes a display, a communication interface, and a processor. The processor is configured to obtain first device information about an external electronic device and first control information for controlling functions of the external electronic device. The processor is configured to obtain icon information corresponding to the first device information using an artificial intelligence model, generate a first icon based on the icon information, and display the generated first icon as an icon of an application associated with an external electronic device The processor is configured to obtain user interface information corresponding to the first control information using the artificial intelligence model and generate UI widgets for display when the application is executed The processor is configured to obtain layout information about the UI widgets using the artificial intelligence model and display the UI widgets at a position corresponding to the layout information when the application is executed.

20 Claims, 12 Drawing Sheets

(58) Field of Classification Search
USPC .......................................................... 709/208
See application file for complete search history.

(56) References Cited

U.S. PATENT DOCUMENTS

| | | | |
|---|---|---|---|
| 2020/0334055 A1 | 10/2020 | Cho et al. | |
| 2021/0117152 A1* | 4/2021 | Deisher | ................... G06N 3/04 |
| 2021/0132962 A1* | 5/2021 | Makhija | ................... G06F 9/454 |
| 2021/0334116 A1* | 10/2021 | Kaplan | ................. G06F 3/0482 |
| 2022/0197484 A1* | 6/2022 | Neuberger, Jr. | ..... G06F 3/04845 |

FOREIGN PATENT DOCUMENTS

| | | | | |
|---|---|---|---|---|
| KR | 10-2017-0078459 A | 7/2017 | | |
| KR | 10-1859959 B1 | 5/2018 | | |
| KR | 10-2019-0053675 A | 5/2019 | | |
| KR | 20190106942 | * | 9/2019 | ............. G06F 9/451 |
| KR | 10-2019-0119018 A | 10/2019 | | |
| KR | 10-2019-0123661 A | 11/2019 | | |
| KR | 20190123661 | * | 11/2019 | ............. G06N 20/00 |

* cited by examiner

METHOD FOR GENERATING APPLICATION FOR CONTROLLING EXTERNAL ELECTRONIC DEVICE AND ELECTRONIC APPARATUS FOR SUPPORTING THE SAME

CROSS-REFERENCE TO RELATED APPLICATIONS

This application is a National Phase Entry of PCT International Application No. PCT/KR2021/006167, which was filed on May 17, 2021, and claims priority to Korean Patent Application No. 10-2021-0012091, which was filed on Jan. 28, 2021, the contents of which are incorporated herein by reference.

BACKGROUND

1. Field

Various embodiments of the disclosure relate to a method for generating an application for controlling an external electronic device and an electronic device for supporting the same.

2. Description of Related Art

The Internet has evolved from a human-centered connection network, in which humans create and consume information, into the Internet of Things (IoT), in which distributed components, such as objects, exchange and process information without human intervention.

In an IoT environment, an intelligent Internet Technology (IT) service that collects and analyzes data generated from connected objects may be provided to create new value in human lives. The IoT is applicable to various fields, such as smart homes, smart buildings, smart cities, smart cars or connected cars, smart grids, health care, smart home appliances, and advanced medical care services through various convergences and integrations of existing information technology.

Recently, applications to control electronic devices, such as a TV, an air conditioner, and a washing machine, through a terminal in an IoT environment have been provided. A user can manage or control various electronic devices using an application installed in a terminal.

SUMMARY

Generally, an application for controlling an electronic device used in an IoT environment is provided by installing a completed application in a terminal. For example, an application for controlling an electronic device is provided in a manner such that a terminal downloads and installs the application from the App Store or the terminal receives and installs an application package through the Web.

Therefore, when a user adds or changes an electronic device to be controlled, the user inevitably needs to update the application by the terminal, and when a new function is added to the electronic device, it is difficult to quickly add a menu for controlling the function to the application.

In consideration of the above problems, various embodiments of the disclosure provide a method of obtaining device information from an external electronic device to be controlled, transmitting the obtained device information to an artificial intelligence (AI) widget, generating one or more user interface (UI) widgets corresponding to the device information, based on one or more AI models included in the AI widget, and generating an application including the generated one or more UI widgets as an application for controlling the external electronic device, and an electronic device for supporting the same.

Technical problems to be solved by various embodiments of the disclosure are not limited to the technical tasks mentioned above, and other technical tasks not mentioned will be clearly understood by those skilled in the art to which various embodiments of the disclosure pertain from the following description.

An electronic device according to various embodiment of the disclosure may include: a display; a communication interface; and at least one processor configured to be functionally connected to the display and the communication interface, wherein the at least one processor may be configured to: obtain first device information about a first external electronic device and first control information for controlling one or more functions provided by the first external electronic device from the first external electronic device; obtain first icon information corresponding to the obtained first device information using an artificial intelligence model, generate a first icon based on the obtained first icon information, and display the generated first icon as an icon of a first application associated with the first external electronic device; obtain user interface (UI) information corresponding to the obtained first control information using the artificial intelligence model and generate one or more UI widgets to be displayed when the first application is executed based on the obtained UI information; and obtain layout information about the one or more UI widgets using the artificial intelligence model and display the one or more UI widgets at a position corresponding to the obtained layout information when the first application is executed.

In a method for performing a function using a biometric signal in an electronic device according to various embodiments of the disclosure, a method for generating an application for controlling an external electronic device in an electronic device may include: obtaining first device information about a first external electronic device and first control information for controlling one or more functions provided by the first external electronic device from the first external electronic device; obtaining first icon information corresponding to the obtained first device information using an artificial intelligence model, generating a first icon based on the obtained first icon information, and displaying the generated first icon as an icon of a first application associated with the first external electronic device; obtaining user interface (UI) information corresponding to the obtained first control information using the artificial intelligence model and generating one or more UI widgets to be displayed when the first application is executed based on the obtained UI information; and obtaining layout information about the one or more UI widgets using the artificial intelligence model and displaying the one or more UI widgets at a position corresponding to the obtained layout information when the first application is executed.

A method for generating an application for controlling an external electronic device and an electronic device for supporting the same according to various embodiments of the disclosure may quickly and accurately generate an application for controlling an external electronic device, based on an AI model. Further, the method and the electronic device according to various embodiments may generate an application, based on the usage history of each external electronic device without intervention by a user and may easily reform a previously generated application to be used for a different external electronic device.

DETAILED DESCRIPTION

Figure 1:
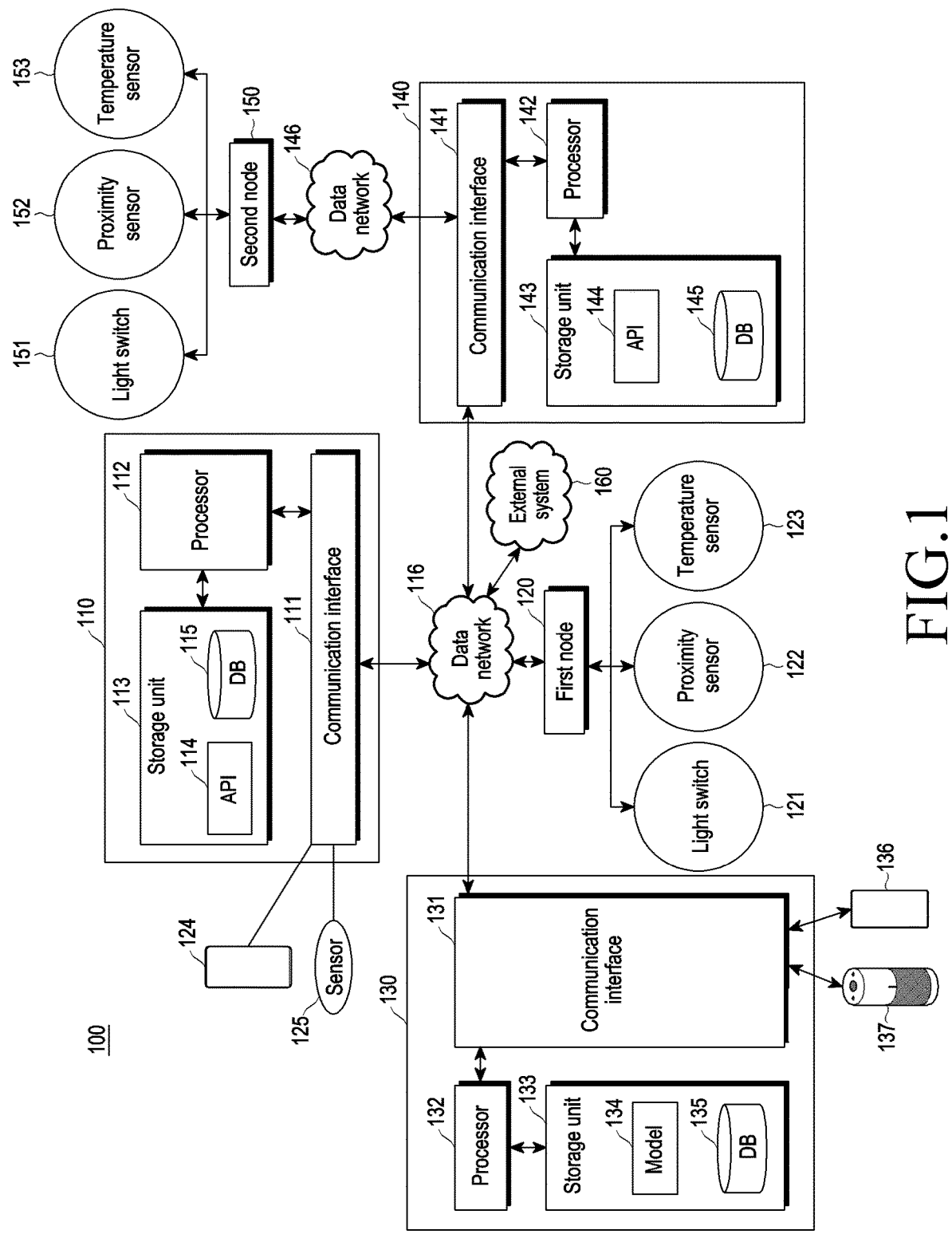
FIG. 1 illustrates an Internet of Things (IoT) system according to an embodiment.

FIG. 1 illustrates an Internet of Things (IoT) system 100 according to an embodiment. At least some components of FIG. 1 may be omitted, and components not shown in FIG. 1 may be further included.

Referring to FIG. 1, the IoT system 100 according to the embodiment includes a plurality of electronic devices connectable to a data network 116 or 146. For example, the IoT system 100 may include at least one of a first IoT server 110, a first node 120, a voice assistant server 130, a second IoT server 140, a second node 150, or devices 121, 122, 123, 124, 125, 136, 137, 151, 152, and 153.

According to an embodiment, the first IoT server 110 may include at least one of a communication interface 111, a processor 112, or a storage unit 113. The second IoT server 140 may include at least one of a communication interface 141, a processor 142, and a storage unit 143. An "IoT server" disclosed herein may remotely control and/or monitor one or more devices (e.g., the devices 121,122,123,124,125,151, 152, and 153) through a relay device (e.g., the first node 120 or the second node 150) or directly without a relay device, based on a data network (e.g., the data network 116 or the data network 146). A "device" disclosed herein is, for example, a sensor, a home appliance, an office electronic device, or a device for performing a process that is disposed (or located) in a local environment, such as a house, an office, a factory, a building, an external place, or other types of properties, and is not limited to a specific type. A device that receives a control command and performs an operation corresponding to the control command may be referred to as a "target device". The IoT server may be referred to as a central server in that the IoT server selects a target device from among a plurality of devices and provides a control command.

According to an embodiment, the first IoT server 110 may communicate with devices 121, 122, and 123 through the data network 116. The data network 116 may refer to a network for long-distance communication, such as the Internet or a computer network (e.g., LAN or WAN), or may include a cellular network.

According to an embodiment, the first IoT server 110 may be connected to the data network 116 through the communication interface 111. The communication interface 111 may include a communication device (or a communication module) for supporting communication of the data network 116, and may be configured as one integrated component (e.g., a single chip) or may be configured with a plurality of separate components (e.g., a plurality of chips). The first IoT server 110 may communicate with the devices 121, 122, and 123 through the first node 120. The first node 120 may receive data from the first IoT server 110 through the data network 116 and may transmit the received data to at least some of the devices 121, 122, and 123. Alternatively, the first node 120 may receive data from at least some of the devices 121, 122, and 123 and may transmit the received data to the first IoT server 110 through the data network 116. The first node 120 may function as a bridge between the data network 116 and the devices 121, 122, and 123. Although FIG. 1 shows one first node 120, which is only for illustration, the number of first nodes is not limited.

According to an embodiment, the first IoT server 110 may support direct communication with devices 124 and 125. Here, "direct communication" is communication not through a relay device, for example, the first node 120, and may refer to, for example, communication through a cellular communication network and/or a data network.

According to an embodiment, the first IoT server 110 may transmit a control command to at least some of the devices 121, 122, 123, 124, and 125. Here, a "control command" may refer to data to cause a controllable device to perform a specific operation, and the specific operation may be an operation performed by a device and may include outputting information, sensing information, reporting information, or managing (e.g., deleting or generating) information, without being limited to a type. For example, the processor 112 may obtain information (or a request) for generating a control command from the outside (e.g., the voice assistant server 130, the second IoT server 140, an external system 160, or at least some of the devices 121, 122, 123, 124, and 125) and may generate a control command, based on the obtained information. Alternatively, the processor 112 may generate a control command, based on the result of monitoring at least some of the devices 121, 122, 123, 124, and 125 satisfying a specified condition. The processor 112 may control the communication interface 111 to transmit a control command to a target device.

According to an embodiment, the processor 112, a processor 132, or the processor 142 may be configured as a combination of one or more of a general-purpose processor, such as a central processing unit (CPU), a digital signal processor (DSP), an application processor (AP), or a communication processor (CP), a graphics-dedicated processor, such as a graphics processing unit (GPU) or a vision processing unit (VPU), or an artificial intelligence-dedicated processor, such as a neural processing unit (NPU). The foregoing processing units are merely for illustration, and those skilled in the art will understand that the processor 112 is not limited as long as the processor 112 is an operational device capable of executing an instruction stored in a storage unit 113 and outputting the execution result.

According to an embodiment, the processor 112 may configure a web-based interface, based on an API 114 or may expose a resource managed by the first IoT server 110 to the outside. The web-based interface may support, for example, communication between the first IoT server 110 and an external web service. The processor 112 may allow, for example, the external system 160 to control and/or access the devices 121, 122, and 123. The external system 160 may be, for example, an independent system that is not associated with the IoT system 100 or is not part of the IoT system 100. The external system 160 may be, for example, an external server or a website. However, security is used to access to the devices 121, 122, and 123 or a resource of the first IoT server 110 from the external system 160. According to an embodiment, the processor 112 may expose an API endpoint (e.g., a universal resource locator (URL)) based on the API 114 to the outside using an automation application. As described above, the first IoT server 110 may transmit a control command to a target device among the devices 121, 122, and 123. A description of the communication interface 141, the processor 142, and an API 144 and a database 145 of the storage unit 143 of the second IoT server 140 is substantially the same as that of the communication interface 111, the processor 112, and the API 114 and a database 115 of the storage unit 113 of the first IoT server 110. Further, a description of the second node 150 may be substantially the same as that is the first node 120. The second IoT server 140 may transmit a control command to a target device among devices 151, 152, and 153. The first IoT server 110 and the second IoT server 140 may be operated by the same service provider in one embodiment but may be operated by different service providers in another embodiment.

According to an embodiment, the voice assistant server 130 may transmit and receive data to and from the first IoT server 110 through the data network 116. According to an embodiment, the voice assistant server 130 may include at least one of a communication interface 131, a processor 132, and a storage unit 133. The communication interface 131 may communicate with a smartphone 136 or an AI speaker 137 through a data network (not shown) and/or a cellular network (not shown). The smartphone 136 or the AI speaker 137 may include a microphone, and may obtain a user voice, may convert the user voice into a voice signal, and may transmit the voice signal to the voice assistant server 130. The processor 132 may receive the voice signal from the smartphone 136 or the AI speaker 137 through the communication interface 131. The processor 132 may process the received voice signal, based on a stored model 134. The processor 132 may generate (or identify) a control command using the processing result, based on information stored in the database 135. According to an embodiment, the storage units 113, 133, and 143 may include at least one type of a non-transitory storage medium among a flash memory type, a hard disk type, a multimedia card micro type, a card-type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk and is not limited to a type.

Various embodiments of the disclosure provide a method of obtaining device information from an external electronic device to be controlled, transferring the obtained device information to an artificial intelligence (AI) widget, generating one or more user interface (UI) widgets corresponding to the device information, based on one or more AI models included in the AI widget, and generating an application including the generated one or more UI widgets as an application for controlling the external electronic device, and an electronic device for supporting the same.

Hereinafter, various embodiments will be described with reference to drawings. In the drawings, "application" will be abbreviated to "App".

Figure 2:
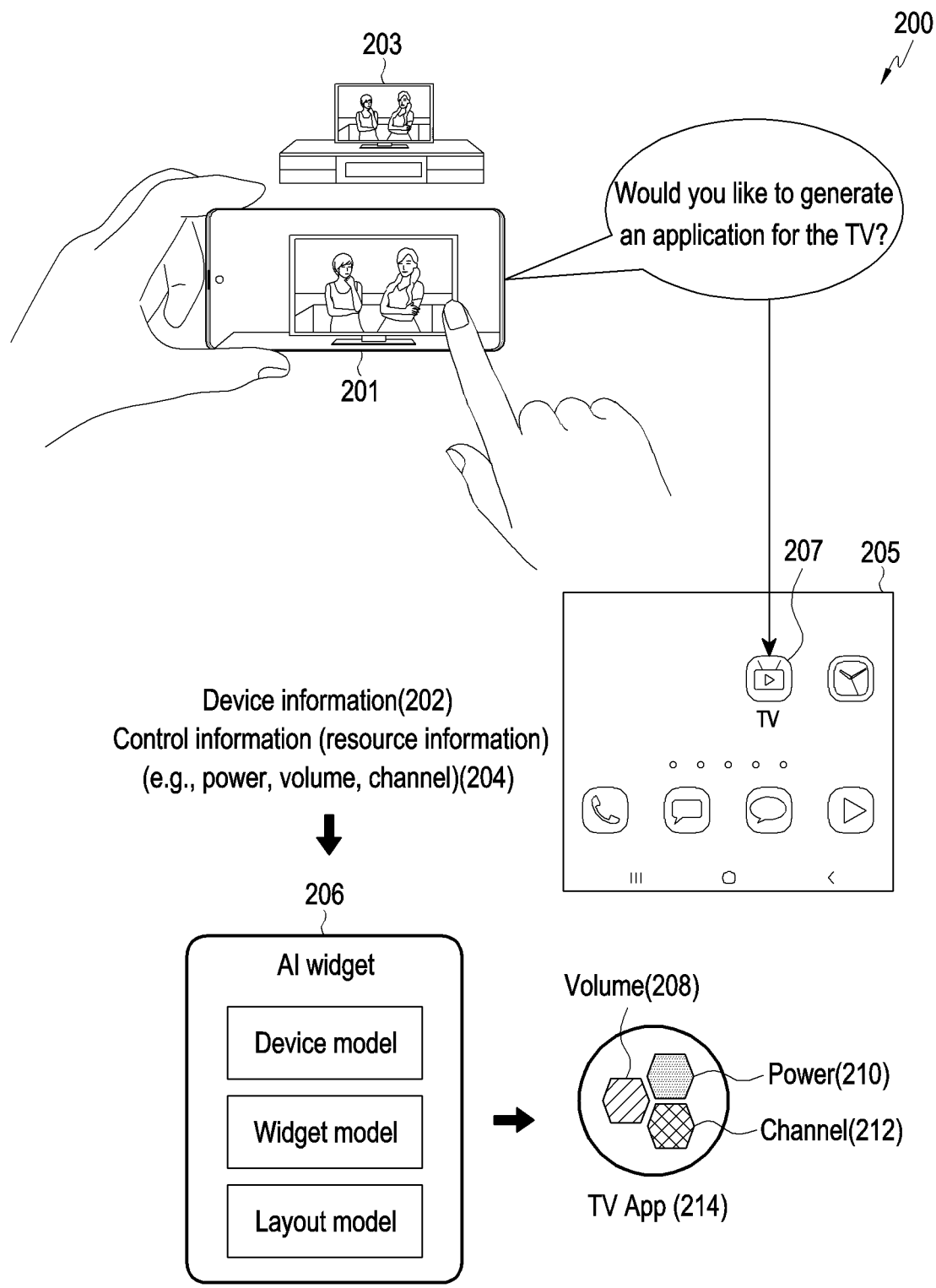
FIG. 2 schematically illustrates a process of generating an application for controlling an external electronic device using an electronic device according to various embodiments.

FIG. 2 is a diagram 200 schematically illustrating a process of generating an application for controlling an external electronic device using an electronic device according to various embodiments.

Referring to FIG. 2, an electronic device 201 according to various embodiments may be a terminal, such as a smartphone or a tablet PC. The electronic device 201 according to various embodiments may be the voice assistant server 130 or the second IoT server 140 of FIG. 1. However, the electronic device 201 is not limited to these devices and may be any device that is capable of communication between devices, such as device-to-device (D2D) communication and is capable of accessing a server (e.g., a cloud server) on a network.

According to an embodiment, the electronic device 201 may retrieve an external electronic device 203 according to a user's selection or autonomously. The external electronic device 203 may be an electronic device used in an IoT environment and may be, for example, a home appliance including a TV, a washing machine, or an air conditioner. The external electronic device 203 may support control of one or more functions provided by the external electronic device 203 through an application. According to an embodiment, when the electronic device 201 retrieves a TV as the external electronic device 203, the electronic device 201 may output a voice signal to receive a user selection, for example, "Would you like to generate an application for the TV?", or may display a text to receive a user selection on a display and may receive a user selection with respect to whether to generate the application. When a user selects to generate the application for the TV, that is, a TV application, the electronic device 201 may generate the TV application and may display the generated TV application as an icon 207 on a screen 205 of the electronic device 201.

The TV application may provide one or more UI widgets for controlling the function of the TV. The TV application may be generated through an AI widget 206, based on device information 202 (e.g., a device access uniform resource identifier (URI) and a device name for connecting to the TV) and control information 204 (information for controlling the function of the TV, e.g., URI resource information for controlling at least one of power, volume, or channel) about the TV.

When the device information 202 and the control information 204 are input, the AI widget 206 may generate an application for the external electronic device 203 using one or more AI models. FIG. 2 shows that the AI widget 206 includes a device model, a widget model, and a layout model as the one or more AI models.

In an embodiment, when the device information 202 is input, the AI widget 206 may generate the icon 207 (e.g., a TV icon) corresponding to a device name (e.g., TV) included in the device information 202 using the device model.

In an embodiment, when the control information 204 (e.g., a resource URI for controlling the function of the external electronic device 203) is input, the AI widget 206 may generate one or more widgets (or UIs) corresponding to the control information 204 using the widget model. According to an embodiment, when information about volume control, power on/off, and channel selection is input as the control information 204 about the TV, the AI widget 206 may generate a volume UI widget 208, a power UI widget 210, and a channel UI widget 212 corresponding to the information about volume control, power on/off, and channel selection using the widget model.

The AI widget 206 may determine the layout positions of the generated volume UI widget 208, power UI widget 210, and channel UI widget 212, based on the layout model, and may dispose and display the volume UI widget 208, the power UI widget 210, and the channel UI widget 212 at the determined positions when the TV application 214 is executed. The user may perform at least one operation of volume control, power on/off, and channel selection in the TV, based on the volume UI widget 208, the power UI widget 210, and the channel UI widget 212 displayed when the TV application 214 is executed.

Figure 3:
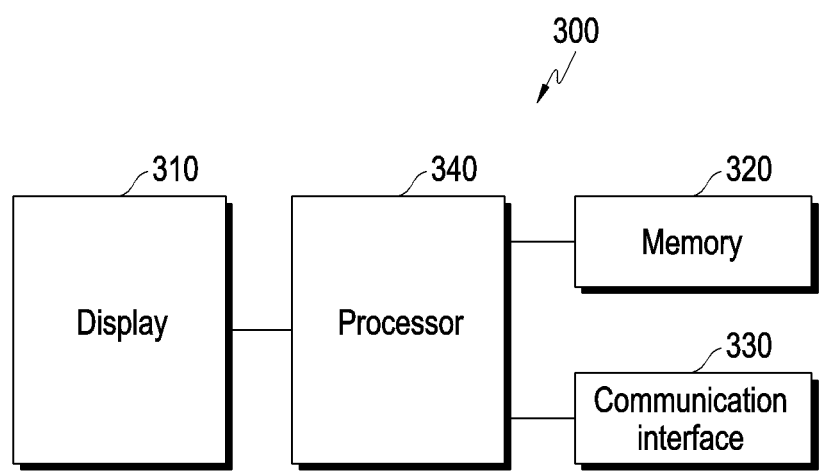
FIG. 3 illustrates a block diagram of an electronic device according to various embodiments.

FIG. 3 is a block diagram 300 of an electronic device according to various embodiments.

The electronic device according to various embodiments may be the voice assistant server 130 or the second IoT server 140 of FIG. 1. The electronic device according to various embodiments may be the electronic device 201 of FIG. 2 or an electronic device to be described below.

Referring to FIG. 3, in an embodiment, the electronic device may include a display 310, a communication interface 330, a memory 320, and a processor 340.

The display 310 may display information generated by the processor 340, information input by a user, information received from at least one external electronic device or a network, or the like under control of the processor 340.

In an embodiment, the display 310 may display an icon corresponding to an application for controlling an external electronic device generated using an AI widget and may display one or more UI widgets when the application is executed. In an embodiment, the display 310 may display the result of controlling the external electronic device. In an embodiment, the display 310 may display various menus for receiving a user selection for generating or executing the application or controlling the external electronic device. Information displayed by the display 310 is not limited to the foregoing examples.

The communication interface 330 may include an interface for communication with one or more external electronic devices and an interface for communication with a network server. In an embodiment, the communication interface 330 may communicate with one or more external electronic devices using a D2D communication method or the like. In an embodiment, the communication interface 330 may access a cloud server to obtain an AI widget. In an embodiment, the communication interface 330 may be included in at least one of the communication interface 131 and the communication interface 141 of FIG. 1.

The memory 320 may store various types of information according to the operation of the processor 340. The memory 320 may store at least one of information generated by the processor 340, information input through the communication interface 330, information received from one or more external electronic devices or a network through the communication interface 330, or information transmitted to a different device or a network through the communication interface 330. According to various embodiments, the memory 320 may store information, a command, and an indicator for generating and controlling an application of an external electronic device and may store the AI widget obtained from the cloud server.

In an embodiment, the memory 320 may include a volatile memory or a nonvolatile memory. In an embodiment, the memory 320 may be included in at least one of the storage unit 133 and the storage unit 143 of FIG. 1.

In an embodiment, the processor 340 may include one or more processors.

In an embodiment, the processor 340 may control the display 310, the memory 320, and the communication interface 330.

In an embodiment, the processor 340 may be included in at least one of the processor 132 and the processor 142 of FIG. 1.

In an embodiment, the processor 340 may perform operations performed by the electronic device 300 according to various embodiments to be described below.

An electronic device according to various embodiments may include: a display 310; a communication interface 330, and at least one processor 340 functionally connected to the display 310 and the communication interface 330, wherein the at least one processor 340 may be configured to: obtain device information about a first external electronic device and control information for controlling one or more functions provided by the first external electronic device from the first external electronic device; obtain first icon information corresponding to the obtained device information using an artificial intelligence model, generate a first icon based on the obtained first icon information, and display the generated first icon as an icon of a first application associated with the first external electronic device; obtain user interface (UI) information corresponding to the obtained control information using the artificial intelligence model and generate one or more UI widgets to be displayed when the first application is executed based on the obtained UI information; and obtain layout information about the one or more UI widgets using the artificial intelligence model and display the one or more UI widgets at a position corresponding to the obtained layout information when the first application is executed.

According to various embodiments, the at least one processor 340 may be configured to obtain, as the device information, at least one of uniform resource identifier (URI) information for accessing the first external electronic device and name information about the first external electronic device.

According to various embodiments, the at least one processor 340 may be configured to obtain the device information and the control information from the first external electronic device using a device-to-device (D2D) communication method.

According to various embodiments, the at least one processor 340 may be configured to: obtain an artificial intelligence widget from a cloud server; and use the artificial intelligence model included in the artificial intelligence widget.

According to various embodiments, the at least one processor 340 may be configured to: identify a UI widget selected by a user from among the one or more UI widgets; identify control information corresponding to the identified UI widget; and transmit the identified control information to the first external electronic device.

According to various embodiments, the at least one processor 340 may be configured to: identify a usage frequency of each of a plurality of external electronic devices during a preset period; identify at least one external electronic device having a usage frequency of a threshold value or greater among the plurality of external electronic devices, based on an identification result; and select one of the at least one external electronic device as the first external electronic device.

According to various embodiments, the at least one processor 340 may be configured to: receive a user input to request generation of an application for controlling the first external electronic device; establish a connection with the first external electronic device specified based on the user input; and obtain the device information and the control information from the first external electronic device, based on the established connection.

According to various embodiments, the at least one processor 340 may be configured to obtain control information for controlling the one or more functions having a usage frequency of a threshold value or greater among controllable functions of the first external electronic device.

According to various embodiments, the at least one processor 340 may be configured to: obtain device information about a second external electronic device and control information for controlling one or more functions provided by the second external electronic device from the second external electronic device; and reform the first application into a second application associated with the second external electronic device, based on the device information about the second external electronic device and the control information about the second external electronic device.

According to various embodiments, the at least one processor 340 may be configured to: obtain second icon information corresponding to the device information about the second external electronic device using the artificial intelligence model, generate a second icon as an icon of the second application based on the second icon information, and display the second icon into which the first icon is reformed; and reform the one or more UI widgets to one or more UI widgets to be displayed when the second application is executed by changing the control information corresponding to the one or more UI widgets to the control information about the second external electronic device.

Figure 4:
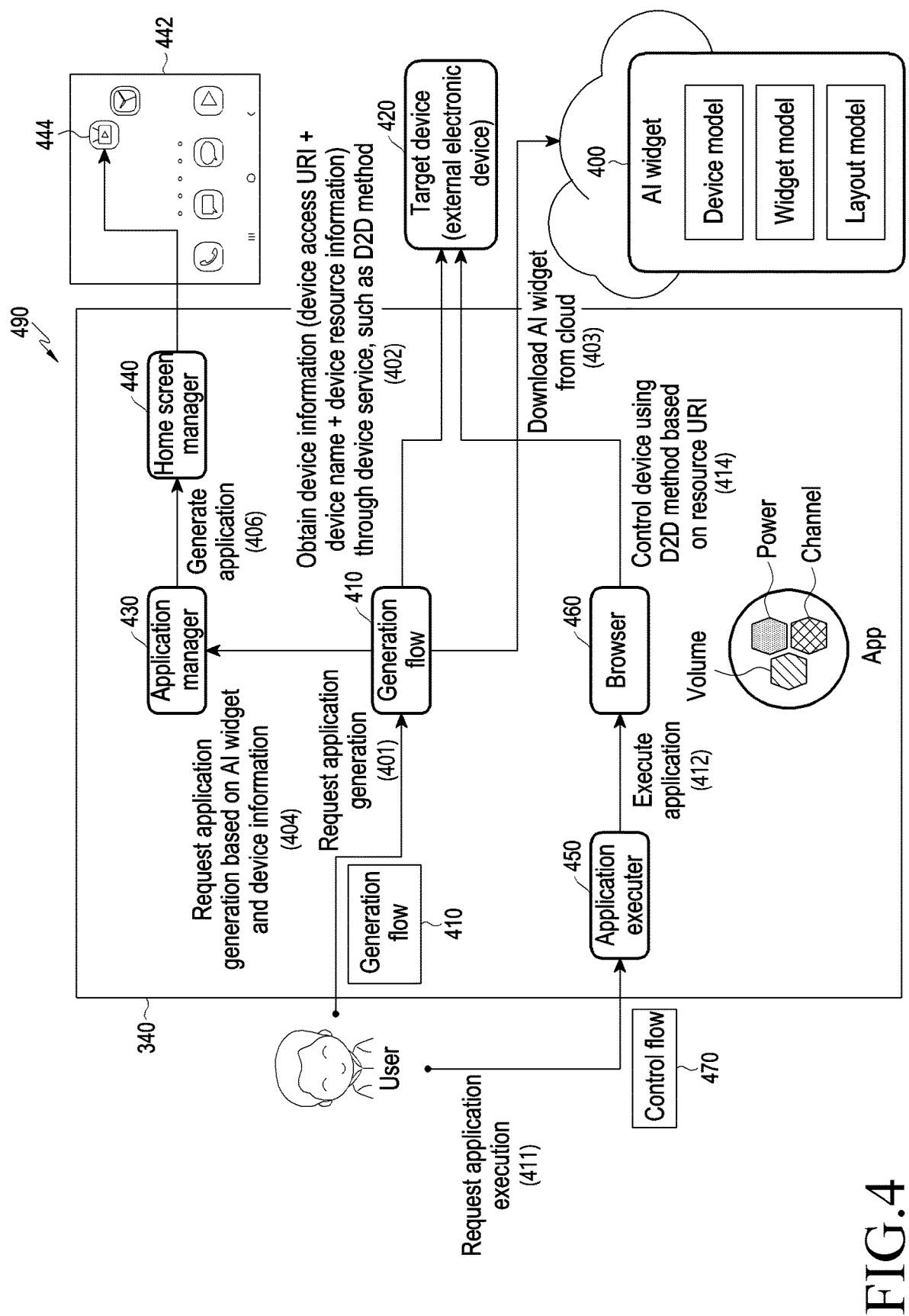
FIG. 4 illustrates a flowchart of an operation in which an electronic device generates an application and controls an external electronic device using the generated application according to various embodiments.

FIG. 4 is a flowchart 490 illustrating a process in which an electronic device generates an application and controls an external electronic device using the generated application according to various embodiments.

Referring to FIG. 4, according to an embodiment, the electronic device may include a device targeter 410, an application manager 430, a home screen manager 440, an application executer 450, and a browser 460.

In an embodiment, the device targeter 410, the application manager 430, the home screen manager 440, the application executer 450, and the browser 460 illustrated in FIG. 4 may be software modules, may be stored in a memory 320, and may be executed by being loaded by a processor 340.

In an embodiment, the device targeter 410, the application manager 430, the home screen manager 440, the application executer 450, and the browser 460 illustrated in FIG. 4 may be components physically separated from the processor 340. In this case, the processor 340 may control the device targeter 410, the application manager 430, the home screen manager 440, the application executer 450, and the browser 460 to perform an operation illustrated in FIG. 4.

In FIG. 4, the electronic device may perform a generation flow 480 (e.g., operations 401, 402, 403, 404, 405, and 406) for generating an application and a control flow 470 (e.g., operations 411, 412, and 414) for controlling an external device using a generated application.

First, the generation flow 480 may start based on an application generation request from a user in operation 401. The application generation request may be a request to generate an application related to the external electronic device and may include information for specifying or identifying the external electronic device.

In an embodiment, the application generation request may be input to the device targeter 410, based on a user selection on a menu displayed on a screen of the electronic device or a separate user input (keypad input or touch input on the screen) to request generation of an application. The device targeter 410 may identify a target device, based on the information included in the application generation request. That is, the device targeter 410 may identify the external electronic device as the target device 420, based on the information included in the application generation request.

In operation 402, the device targeter 410 may obtain device information from the target device 420 through a device service that enables D2D communication. The device information obtained from the target device 420 may include a device access URI, a device name, and resource information for device function control. The device access URI may be information for accessing the target device 420 and may be, for example, a device access address in a local network or a device address in a home network.

According to an embodiment, in operation 403, the device targeter 410 may download an AI widget 400 from a cloud. According to various embodiments, the AI widget 400 may be obtained from a server of a different external network instead of the cloud.

The device targeter 410 may request the application manager 430 to generate an application, based on the AI widget 400 and the device information obtained from the target device 420. The application manager 430 may generate an application, based on the AI widget 400 and the device information in operation 406, and may instruct the home screen manager 440 to display an icon 444 corresponding to the generated application on the screen 442 of the electronic device.

The home screen manager 440 may display the icon 444 corresponding to the generated application, based on an instruction from the application manager 430 on the screen 442 of the electronic device.

Next, the control flow 470 for controlling the external electronic device using the application will be described. The control flow 470 may start based on a request to execute the application generated based on the generation flow 480 in operation 411. According to an embodiment, the application execution request may be generated when the user selects the application icon 444 displayed on the screen 442 of the electronic device. The generated application execution request may be provided to the application executer 450. The application executer 450 may execute the application, based on the application execution request in operation 412.

According to an embodiment, when the executed application is related to a TV, one or more UI widgets for controlling at least one of volume, power, or a channel may be displayed on the screen 442 of the electronic device. When one of the one or more UI widgets is selected by the user, control information (resource information, such as a URI) corresponding to the selected UI widget may be transmitted to the target device 420, based on a D2D method or the like. When the executed application is a web-based application, control information corresponding to a UI widget selected through the browser 460 may be transmitted to the target device 420 as the external electronic device in operation 414.

The target device 420 may perform a function corresponding to the received control information, thereby controlling the operation of the target device 420.

Although FIG. 4 shows that the device targeter 410, the application manager 430, the home screen manager 440, the application executer 450, and the browser 460 are independent modules, the disclosure may not be limited thereto. For example, at least one of the device targeter 410, the application manager 430, the home screen manager 440, the application executer 450, and the browser 460 may be integrated as one module.

Figure 5:
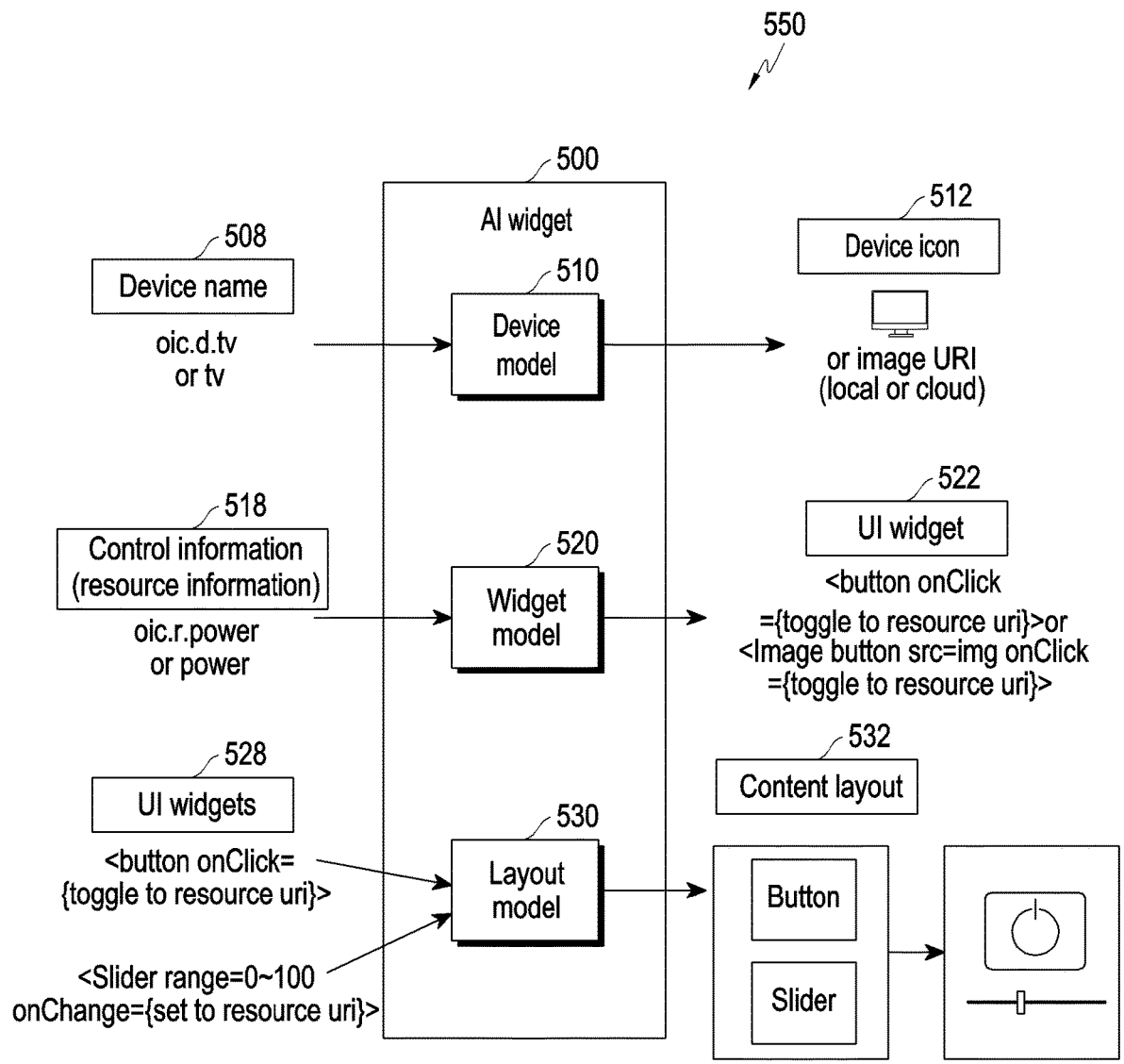
FIG. 5 illustrates a block diagram of an AI widget according to various embodiments.

FIG. 5 is a block diagram 550 of an AI widget according to various embodiments.

Referring to FIG. 5, according to various embodiments, the AI widget 500 may include one or more AI models. In an embodiment, the AI widget 500 may include a device model 510, a widget model 520, and a layout model 530 as the AI models. In an embodiment, the AI widget 500 may correspond to the AI widget 206 of FIG. 2 and the AI widget 400 of FIG. 4 and may also correspond to an AI widget to be described with reference the drawings to be described below.

A device name 508 and control information (resource information for device function control) 518 may be input to the AI widget 500 as device information.

The AI widget 500 may output a device icon 512 corresponding to the input of the device name 508, based on the device model 510.

In an embodiment, the device model 510 may include a word-icon learning model as AI information. In an embodiment, the word-icon learning model may be generated as a result of learning one or more words and one or more icons. In an embodiment, the word-icon learning model may indicate one or more devices corresponding to one or more words and may indicate one or more icons corresponding to one or more devices.

In an embodiment, when the device name is input, the AI widget 500 may provide a device icon corresponding to the device name, based on the word-icon learning model. For example, when "oic.d.tv" or "tv" is input as the device name 508, the AI widget 500 may identify a device (e.g., a television) corresponding to "oic.d.tv" or "tv", based on the word-icon learning model and may provide an icon corresponding to the identified device as the device icon 512. The device icon 512 may be an image icon, but an image stored in the electronic device, a cloud, or an external server may be indicated in the form of a URI.

The AI widget 500 may generate a UI widget 522 corresponding to the input of the control information 518, based on the widget model 520. In an embodiment, one or more UI widgets 522 may be generated. In an embodiment, the widget model 520 may include a widget-function learning model as AI information. In an embodiment, the widget-function learning model may be generated as a result of learning information about one or more widgets and one or more device functions. In an embodiment, the widget-function learning model may indicate one or more device functions corresponding to the input of the control information 518 and may indicate one or more widgets corresponding to the one or more device functions.

In an embodiment, the AI widget 500 may identify a device function (e.g., a power on/off function) corresponding to "oic.r.power" or "power" as the control information 518 and may provide the UI widget 522 corresponding to the identified device function, based on the widget-function learning model.

In an embodiment, the UI widget 522 may be a UI widget for controlling the power on/off function and may include, for example, information "<button onClick={toggle to resource uri}>" or "<Image button src=img onClick={toggle to resource uri}>". "<button onClick={toggle to resource uri}>" may indicate a value to change the function of an external electronic device (e.g., a value for turning on or off power), based on a corresponding resource URI when the UI widget 522 is a button-type icon and the icon is selected by clicking or touching.

"<Image button src=img onClick={toggle to resource uri}>" may indicate a value change the function of an external electronic device (e.g., a value for turning on or off power), based on a corresponding resource URI when the UI widget 522 is an icon having an image and the image is selected by clicking or touching. The resource URI is an example of control information for device control, and when the UI widget 522 is selected, control information corresponding to the resource URI may be transmitted to the electronic device.

After generating the one or more UI widgets, the AI widget 500 may determine positions at which the one or more UI widgets are disposed, based on the layout model 530. The positions at which the one or more UI widgets are disposed may be the layout positions of the one or more UI widgets to be displayed on a screen after an application is executed.

In an embodiment, the layout model 530 may include a layout learning model as AI information. In an embodiment, the layout learning model may be generated as a result of learning resolution information and layout information. In an embodiment, the resolution information may include available resolution information about the electronic device, and the layout information may include layout information for displaying one or more widgets on a screen, based on the number or type of widgets to be displayed.

In an embodiment, when two UI widgets 528, for example, a power UI widget for controlling a power on/off function and a slider UI widget in a slider form for volume control, are generated, information about the generated two UI widgets 528 and the resolution information about the electronic device may be used in the AI widget 500. The AI widget 500 may determine the layout positions of the two UI widgets 528, based on the layout model 530, using the information about the two UI widgets 528 and the resolution information about the electronic device. The two UI widgets 528, that is, the power UI widget and the slider UI widget, may be disposed at the determined layout positions (such as content layout 532) when the application is executed. The power UI widget and the slider UI widget may be displayed as icons.

Although FIG. 5 shows that the AI widget 500 separately includes the device model 510, the widget model 520, and the layout model 530, the disclosure is not limited thereto. For example, the device model 510, the widget model 520, and the layout model 530 may be used as one integrated AI model.

Next, AI models that can be included in an AI widget according to various embodiments will be described in detail with reference to FIG. 6A to FIG. 8B.

Figure 6A:
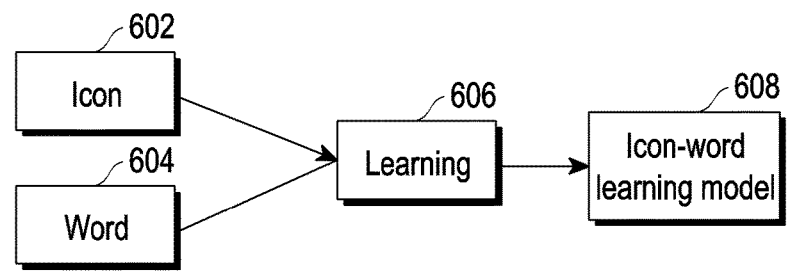
FIGS. 6A and 6B illustrate device models that can be included in an AI widget according to various embodiments.
Figure 6B:
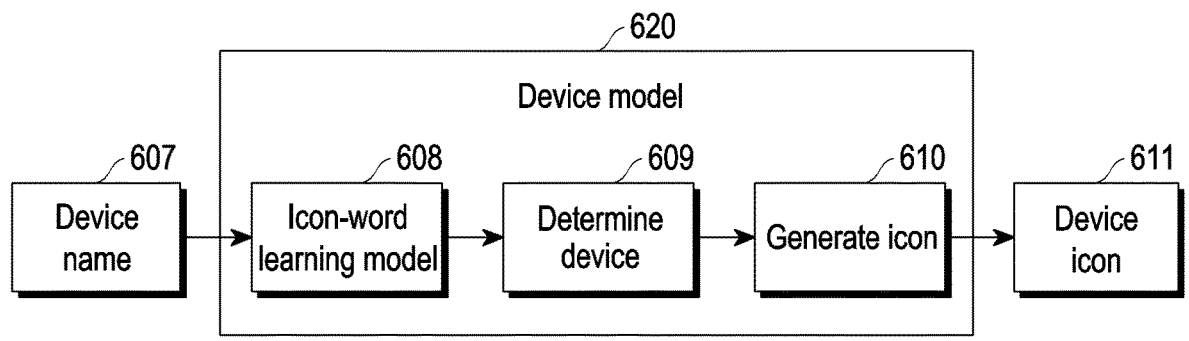

FIGS. 6A and 6B illustrate device models that can be included in an AI widget according to various embodiments.

Referring to FIG. 6A, an icon-word learning model 608 according to an embodiment may be generated as a result of learning (606) one or more icons 602 and one or more words 604 by the AI widget.

In an embodiment, the one or more icons 602 may include image icons associated with one or more devices. In an embodiment, each of the one or more icons 602 may be labeled with data. Data labeling may include an operation of mapping each of the one or more icons 602 to device-related data (e.g., at least one of a device type, a device name, or a device model name) to indicate which device each of the one or more icons 602 corresponds to. The AI widget may learn 606 which device each of the one or more icons 602 represents, based on the data mapped to each of the one or more icons 602.

In an embodiment, the one or more words 604 may include words associated with one or more devices. For example, the one or more words 604 may include words associated with the name, type, model name, or function of each of the one or more devices. The one or more words 604 may be classified and learned by each device. For example, words "TV", "screen", or "channel" may be learned as words associated with "TV", and words "washing", "rinse", or "spin-dry" may be learned as words associated with "washing machine".

In an embodiment, each of the one or more data-labeled icons 602 may be learned (606) to be mapped to one or more words 604. For example, an icon labeled with "TV" among the one or more icons 602 may be learned to be mapped to at least one word (e.g., at least one of "TV", "television", "screen", or "channel") associated with "TV", and an icon labeled with "washing machine" among the one or more icons 602 may be learned to be mapped to at least one word (e.g., at least one of "washing machine", "washing", "rinsing", or "spin-dry") associated with "washing machine". As a result of learning, for example, the icon-word learning model 608 illustrated in Table 1 600 may be generated.

Referring to FIG. 6B, a device model 620 that can be included in the AI widget according to various embodiments may include the icon-word learning model 608. In an embodiment, when a device name 607 is input, the AI widget may determine a device corresponding to the device name, based on the icon-word learning model 608 included in the device model 620 (609). For example, when "tv" is input as the device name, the AI widget may determine a TV as a device associated with a word of "tv", based on the icon-word learning model 608 and may generate an icon corresponding to the TV (610). The icon generated by the AI widget through the device model 620 may be provided as a device icon 611 corresponding to the device name 607.

Figure 7A:
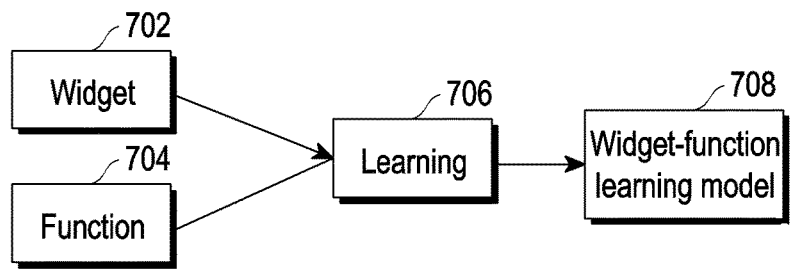
FIGS. 7A and 7B illustrate widget models that can be included in an AI widget according to various embodiments.
Figure 7B:
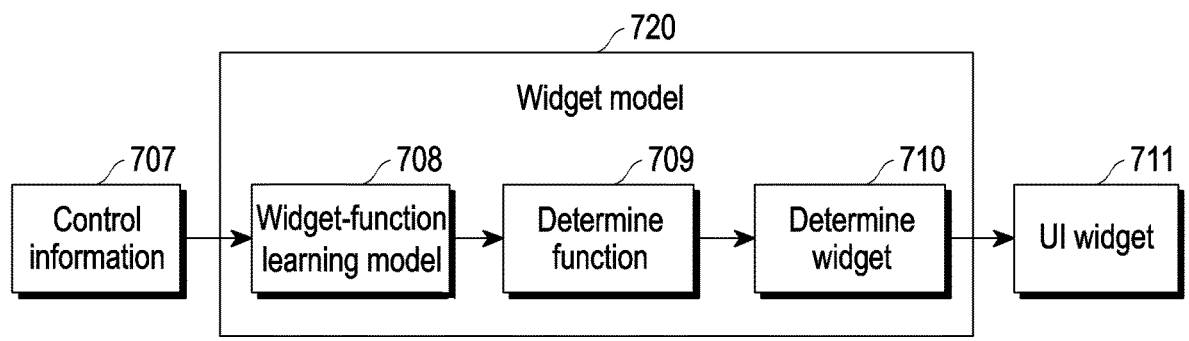

FIGS. 7A and 7B illustrate widget models that can be included in an AI widget according to various embodiments.

Referring to FIG. 7A, a widget-function learning model 708 according to an embodiment may be generated as a result of learning (706) one or more widgets 702 and information 704 about one or more device functions is learned by the AI widget.

In an embodiment, the one or more widgets 702 may include, for example, one or more user interfaces (UIs) for controlling the one or more device functions. In an embodiment, each of the one or more widgets 702 may be labeled with data. For example, each of the one or more widgets 702 may be mapped to data (e.g., at least one of a power UI widget, a volume control UI widget, or a channel selection UI widget) indicating which UI the widget includes. The AI widget may learn (706) which UI widget each of the one or more widgets 702 represents, based on the data mapped to each of the one or more widgets 702.

In an embodiment, the information 704 about the one or more device functions may include information indicating one or more functions provided by each device. For example, when the device is a "TV", the information 704 about the one or more device functions may include information about "power on/off", "volume control", or "channel selection".

In an embodiment, each of the one or more data-labeled widgets 702 may be learned (706) to be mapped to the information 704 about the one or more device functions. For example, a widget labeled with "power UI widget" among the one or more widgets 702 may be learned to be mapped to a "power on" and/or "power off" function, and a widget labeled with "volume control UI widget" among the one or more widgets 702 may be learned to be mapped to "volume up" and/or "volume down". As a result of learning, for example, the widget-function learning model 708 illustrated in Table 2 700 may be generated.

Referring to FIG. 7B, the widget model 720 that can be included in the AI widget according to various embodiments may include the widget-function learning model 708. In an embodiment, when control information 707 is input, the AI widget may determine function information corresponding to the control information 707, based on the widget-function learning model 708 (709), and may determine a widget corresponding to the determined function information (710).

For example, when control information 707 indicating a "power on" operation is input, the AI widget may detect information about a "power on" function corresponding to the input of the control information 707 among the information 704 about the one or more device functions included in the widget-function learning model 708 illustrated in Table 2.The AI widget may detect the "power UI widget" corresponding to the "power on" function from the widget-function learning model 708 and may provide the "power UI widget" as a UI widget 711 corresponding to the control information 707.

Figure 8A:
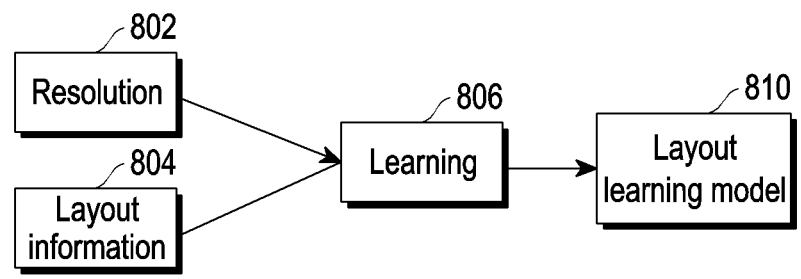
FIGS. 8A and 8B illustrate layout models that can be included in an AI widget according to various embodiments.
Figure 8B:
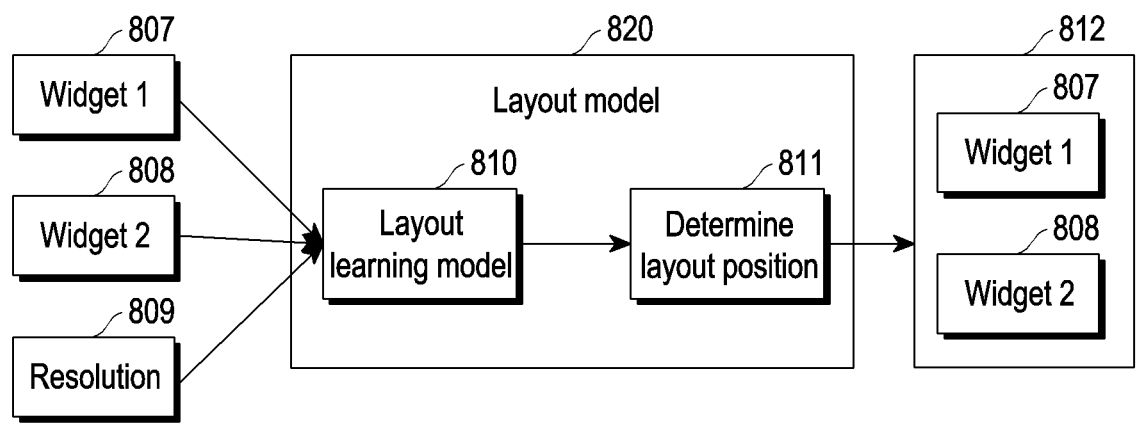

FIGS. 8A and 8B illustrate layout models that can be included in an AI widget according to various embodiments.

Referring to FIG. 8A, a layout learning model 810 according to an embodiment may be generated as a result of learning (806) resolution information 802 and layout information 804. In an embodiment, the AI widget may learn (806) available resolution information 802 about an electronic device and may learn (806) layout information 804 for displaying one or more widgets on a screen, based on the number and/or type of widgets.

In an embodiment, the resolution information 802 and the layout information 804 may be learned (806) in association with each other. For example, each resolution according to the resolution information 802 may be learned (806) to be mapped to the layout information 804 according to the number and/or type of one or more widgets. For example, a resolution of "600 ×1240" may be mapped to layout information about one widget having a widget type of "power UI widget", and a resolution of "720×1280" may be mapped to layout information about two widgets having widget types of "power UI widget" and "volume control UI widget".

Referring to FIG. 8B, the layout model 820 that can be included in the AI widget according to various embodiments may include the layout learning model 810. In an embodiment, when information about one or more widgets, for example, widget 1 807 and widget 2 808, and the resolution information 809 are input, the AI widget may determine the layout positions of widget 1 807 and widget 2 808 suitable for the input number and/or type of the widgets and the resolution information 809, based on the layout learning model 810 (811). In an embodiment, the AI widget may dispose widget 1 807 and widget 2 808 at the determined layout positions to be display on a screen 812 of the electronic device.

Figure 9A:
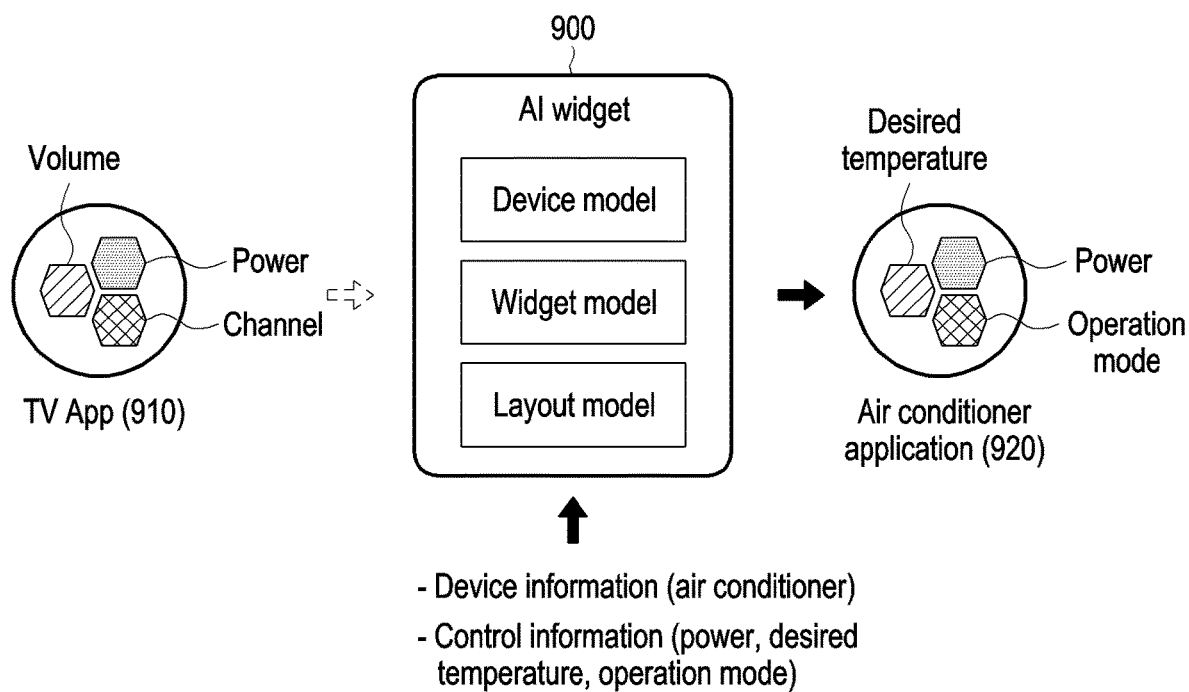
FIGS. 9A and 9B illustrate operations in which an electronic device reforms an application generated for a specific external electronic device into an application for a different external electronic device according to various embodiments.
Figure 9B:
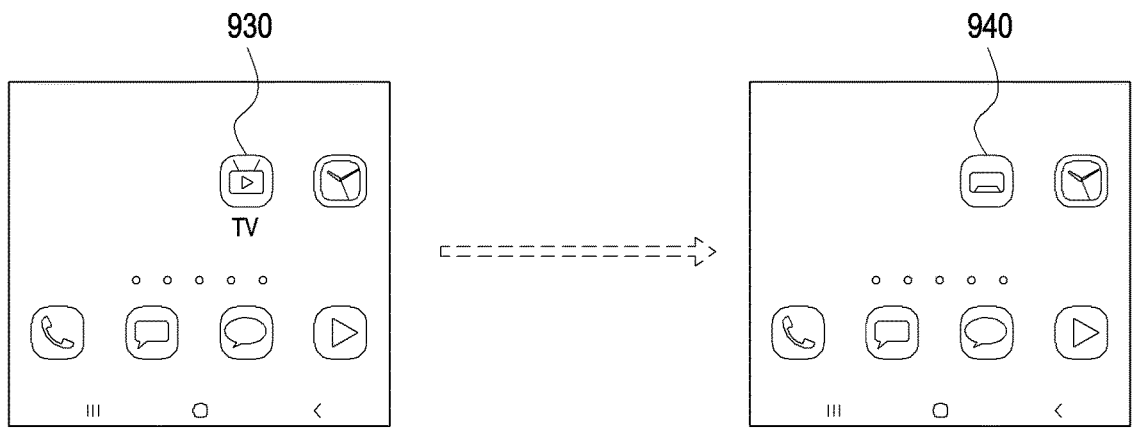

FIGS. 9A and 9B illustrate operations in which an electronic device reforms an application generated for a specific external electronic device into an application for a different external electronic device according to various embodiments.

According to various embodiments, the electronic device may reform an application generated for controlling a specific external electronic device for use as an application for a different external electronic device. Referring to FIG. 9A, in an embodiment, the electronic device may reform a TV application 910 for use as an air conditioner application 920.

To this end, an AI widget 900 may receive information about the TV application 910 used to control a TV in the electronic device, and device information (e.g., a device access URI and a device name) and control information (e.g., information about power, a desired temperature, and an operation mode) about an air conditioner.

The AI widget 900 may generate an icon corresponding to the air conditioner, based on a device model and may change an icon of the TV application to an icon for the air conditioner application. The AI widget 900 may change one or more UI widgets (e.g., volume, power, and channel UI widgets) of the TV application to one or more UI widgets (e.g., desired temperature, power, and operation mode UI widgets) corresponding to resource information about the air conditioner, based on a widget model.

The AI widget 900 may use the layout positions of the one or more UI widgets of the TV application for the one or more UI widgets of the air conditioner application as they are. However, in another embodiment, the AI widget 900 may determine and use the layout positions of the one or more UI widgets of the air conditioner application, based on a layout model.

When the air conditioner application 920 is completely generated, an icon of a TV application 930 may be changed to an icon of an air conditioner application 940, which may be displayed on a screen of the electronic device as shown in FIG. 9B.

Hereinafter, the operation of an electronic device according to various embodiments will be described with reference to FIGS. 10 to FIG. 12. Operations illustrated in FIGS. 10 to FIG. 12 may be performed by the processor 340 of the electronic device 300 illustrated in FIG. 3.

Figure 10:
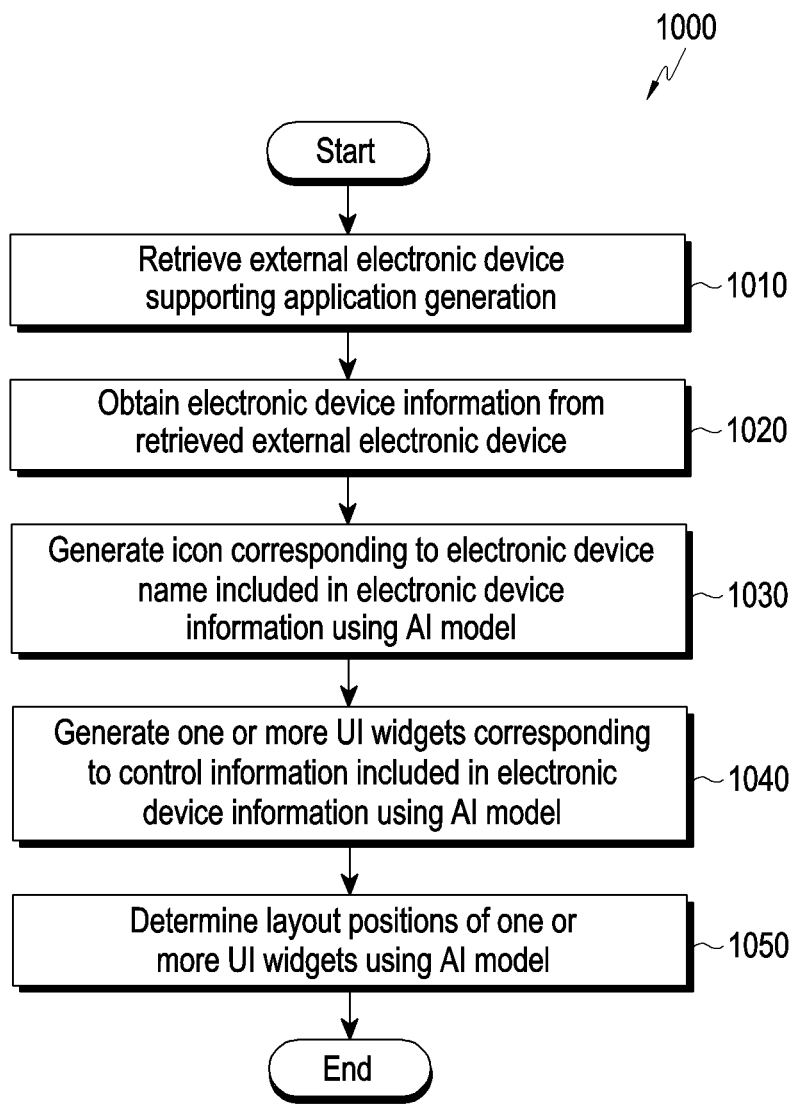
FIG. 10 illustrates a flowchart of an operation in which an electronic device generates an application according to various embodiments.

FIG. 10 is a flowchart 1000 illustrating an operation in which the electronic device 300 generates an application according to various embodiments.

Referring to FIG. 10, in operation 1010, the processor 340 may retrieve an external electronic device supporting generation of an application. In an embodiment, the operation of retrieving the external electronic device may be performed based on an application generation request from a user. In another embodiment, the operation of retrieving the external electronic device may be performed on at least one external electronic device having a usage frequency of a threshold value or greater, based on usage history information about one or more external electronic devices, without a request from the user. The usage history information about the one or more external electronic devices may be obtained through external electronic device management information stored in advance in the electronic device or a separate application to manage the external electronic device management information in an integrated manner.

In operation 1020, the processor 340 may obtain device information about the external electronic device from the retrieved external electronic device. According to an embodiment, the obtained device information may include a device access URI, a device name, and device resource information.

In operation 1030, the processor 340 may generate an icon corresponding to the device name included in the device information using an AI model. In an embodiment, the AI model may include a device model included in an AI widget. In an embodiment, the processor 340 may obtain the AI widget by downloading from a server (e.g., a cloud server) on an external network. According to an embodiment, the icon corresponding to the device name may be an icon representing an application for controlling the external electronic device.

In operation 1040, the processor 340 may generate one or more UI widgets corresponding to control information included in the device information using the AI model. According to an embodiment, the AI model may include a widget model included in the AI widget. According to an embodiment, each of the one or more UI widgets may include resource information for controlling a function of the external electronic device.

In operation 1050, the processor 340 may determine the layout positions of the one or more UI widgets using the AI model. According to an embodiment, the AI model may include a layout model included in the AI widget. In an embodiment, the layout positions of the one or more UI widgets may indicate the layout positions of the one or more UI widgets to be displayed on a screen when the application for controlling the external electronic device is executed. In an embodiment, the application for controlling the external electronic device may be executed when the icon corresponding to the application displayed on the screen of the electronic device is selected by clicking, touching, or key input.

Figure 11:
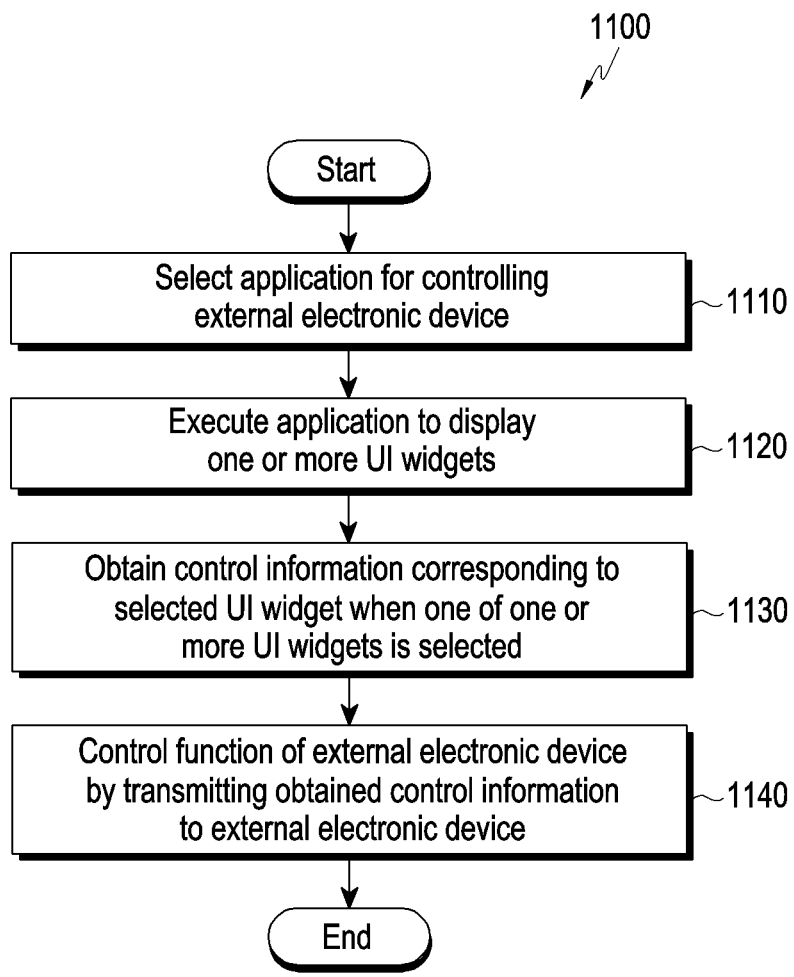
FIG. 11 illustrates a flowchart of an operation in which an electronic device controls an external electronic device using an application according to various embodiments.

FIG. 11 is a flowchart 1100 illustrating an operation in which an electronic device controls an external electronic device using an application according to various embodiments.

Referring to FIG. 11, in operation 1110, the processor 340 may receive an application execution request for an application for controlling an external electronic device. In an embodiment, the application execution request may be received when the application for controlling the external electronic device is selected by a user. For example, when an icon corresponding to the application for controlling the external electronic device displayed on a screen of the electronic device is selected by clicking, touching, or key input, the processor 340 may receive the application execution request.

In operation 1120, the processor 340 may execute the application to display one or more UI widgets on the screen in response to the application execution request.

In operation 1130, when one of the one or more UI widgets is selected, the processor 340 may obtain control information corresponding to the selected UI widget. According to an embodiment, the control information may include resource information for controlling a function of the external electronic device.

In operation 1140, the processor 340 may control the function of the external electronic device by transmitting the obtained control information to the external electronic device. In an embodiment, the processor 340 may display a result of controlling the function of the external electronic device on the screen.

Figure 12:
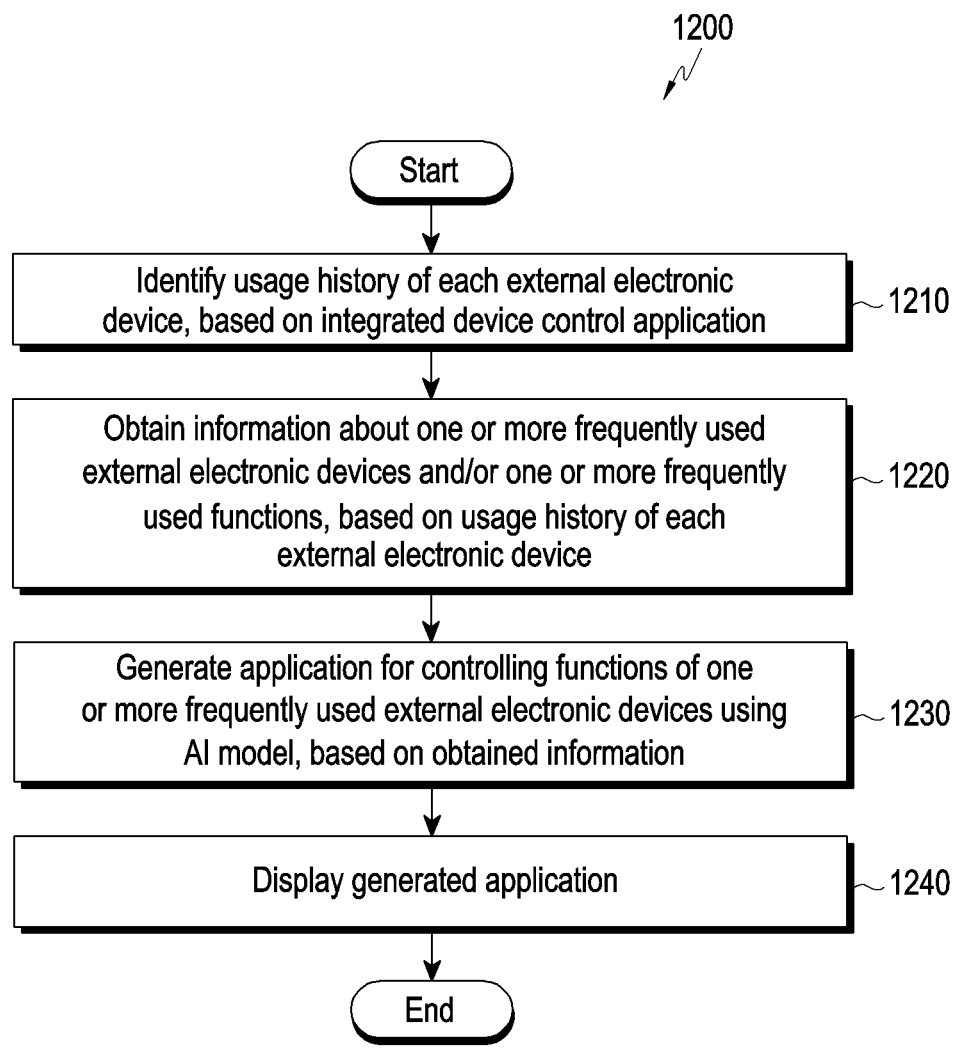
FIG. 12 illustrates a flowchart of an operation in which an electronic device generates an application, based on the usage history of each external electronic device according to various embodiments.

FIG. 12 is a flowchart 1200 illustrating an operation in which an electronic device generates an application, based on the usage history of each external electronic device according to various embodiments.

Referring to FIG. 12, in operation 1210, the processor 340 may identify the usage history of each external electronic device, based on an integrated device control application. In an embodiment, the integrated device control application may be an application that manages one or more external electronic devices used by a user. In an embodiment, the integrated device control application may provide statistical information, such as the usage frequency of each external electronic device during a preset period and/or the usage frequency of each external electronic device function during a preset period, as the usage history of each external electronic device In operation 1220, the processor 340 may obtain information about one or more frequently used external electronic devices and/or one or more frequently used external electronic device functions, based on the usage history of each external electronic device. In an embodiment, the processor 340 may further obtain device connection information.

In an embodiment, the processor 340 may obtain information illustrated in Table 1. When the information illustrated in Table 1 is obtained, the processor 340 may identify a TV and a washing machine as frequently used external electronic devices and may obtain name and connection information about each of the TV and washing machine. Further, the processor 340 may identify "power on/off", "volume control" and "channel selection" functions as functions frequently used by a user among functions provided by the TV and may identify "power", "washing" and "rinse and spin-dry" functions as functions frequently used by the user among functions provided by the washing machine.

TABLE 1

| Name of frequently used external electronic device | Device connection information | Frequently used function |
|---|---|---|
| TV | TV URI (e.g., http://home address.tv) | Power on/off Volume control Channel selection |
| Washing machine | Washing machine URI (e.g., http://home address.wm) | Power on/off Washing Rinse and spin-dry |
| . . . | . . . | . . . |

In operation 1230, the processor 340 may generate an application for controlling functions of the one or more frequently used external electronic devices using one or more AI models, based on the information obtained in operation 1220. In an embodiment, when the information illustrated in Table 1 is obtained, the processor 340 may generate an application for controlling the TV and the washing machine using an AI widget including one or more AI models.

For example, the processor 340 may generate an icon corresponding to the name of each of the TV and the washing machine, based on a device model in the AI widget. In addition, the processor 340 may generate UI widgets corresponding to the respective frequently used functions ("power on/off", "volume control", and "channel selection") for the TV, based on a widget model in the AI widget. Likewise, the processor 340 may generate UI widgets corresponding to the respective frequently used functions ("power on/off", "washing", and "rinse and spin-dry") for the washing machine, based on the widget model in the AI widget. The processor 340 may determine the layout positions of the UI widgets generated for each of the TV and washing machine, based on a layout model in the AI widget.

In operation 1240, the processor 340 may display the generated application. In an embodiment, the generated application may be displayed as an icon generated corresponding to a device name. In an embodiment, the icon representing the application may be an icon representing a corresponding external electronic device. In an embodiment, when the generated application is executed according to a user selection, the processor 340 may display the UI widgets at the determined layout positions.

A method for generating an application for controlling an external electronic device in an electronic device according to various embodiments may include: obtaining device information about a first external electronic device and control information for controlling one or more functions provided by the first external electronic device from the first external electronic device; obtaining first icon information corresponding to the obtained device information using an artificial intelligence model, generating a first icon based on the obtained first icon information, and displaying the generated first icon as an icon of a first application associated with the first external electronic device; obtaining user interface (UI) information corresponding to the obtained control information using the artificial intelligence model and generating one or more UI widgets to be displayed when the first application is executed based on the obtained UI information; and obtaining layout information about the one or more UI widgets using the artificial intelligence model and displaying the one or more UI widgets at a position corresponding to the obtained layout information when the first application is executed.

According to various embodiments, the obtaining of the device information may obtain, as the device information, at least one of uniform resource identifier (URI) information for accessing the first external electronic device and name information about the first external electronic device.

According to various embodiments, the obtaining of the device information and the control information may obtain the device information and the control information from the first external electronic device using a device-to-device (D2D) communication method.

According to various embodiments, the method may further include: obtaining an artificial intelligence widget from a cloud server; and obtaining the artificial intelligence model from the artificial intelligence widget.

According to various embodiments, the method may further include: identifying a UI widget selected by a user from among the one or more UI widgets; identifying control information corresponding to the identified UI widget; and transmitting the identified control information to the first external electronic device.

According to various embodiments, the method may further include: identifying a usage frequency of each of a plurality of external electronic devices during a preset period; identifying at least one external electronic device having a usage frequency of a threshold value or greater among the plurality of external electronic devices, based on an identification result; and selecting one of the at least one external electronic device as the first external electronic device.

According to various embodiments, the method may further include: receiving a user input to request generation of an application for controlling the first external electronic device; establishing a connection with the first external electronic device specified based on the user input; and obtaining the device information and the control information from the first external electronic device, based on the established connection.

According to various embodiments, the one or more functions may include one or more functions having a usage frequency of a threshold value or greater among controllable functions of the first external electronic device.

According to various embodiments, the method may further include: obtaining device information about a second external electronic device and control information for controlling one or more functions provided by the second external electronic device from the second external electronic device; and reforming the first application into a second application associated with the second external electronic device, based on the device information about the second external electronic device and the control information about the second external electronic device.

According to various embodiments, the reforming of the first application into the second application associated with the second external electronic device may include: obtaining second icon information corresponding to the device information about the second external electronic device using the artificial intelligence model, generating a second icon as an icon of the second application based on the second icon information, and displaying the second icon into which the first icon is reformed; and reforming the one or more UI widgets to one or more UI widgets to be displayed when the second application is executed by changing the control information corresponding to the one or more UI widgets to the control information about the second external electronic device.

The disclosure has been described with reference to exemplary embodiments. It will be understood by those having ordinary skill in the art to which this disclosure belongs that various modifications and variations can be made in the disclosure without departing from the essential characteristics of the disclosure. Therefore, the embodiments disclosed herein should be considered from an illustrative perspective rather than from a restrictive perspective. The scope of the disclosure is defined by the appended claims rather than by the foregoing description, and all differences within the scope equivalent thereto should be construed as being included in the scope of the disclosure.

The invention claimed is:

1. A method for generating an application for controlling an external electronic device in an electronic device, the method comprising:
    obtaining first device information about a first external electronic device and first control information for controlling one or more functions provided by the first external electronic device from the first external electronic device;
    obtaining first icon information corresponding to the obtained first device information using an artificial intelligence model;
    generating a first icon based on the obtained first icon information;
    displaying the generated first icon as an icon of a first application associated with the first external electronic device;
    obtaining user interface (UI) information corresponding to the obtained first control information using the artificial intelligence model;
    generating one or more UI widgets to be displayed when the first application is executed based on the obtained UI information;
    obtaining layout information about the one or more UI widgets using the artificial intelligence model; and
    displaying the one or more UI widgets at a position corresponding to the obtained layout information when the first application is executed.

2. The method of claim 1, wherein the obtaining of the first device information comprises obtaining, as the first device information, at least one of uniform resource identifier (URI) information for accessing the first external electronic device and name information about the first external electronic device.

3. The method of claim 1, wherein the obtaining of the first device information and the first control information comprises obtaining the first device information and the first control information from the first external electronic device using a device-to-device (D2D) communication method.

4. The method of claim 1, further comprising:
    obtaining an artificial intelligence widget from a cloud server; and
    obtaining the artificial intelligence model from the artificial intelligence widget.

5. The method of claim 1, further comprising:
    identifying a UI widget selected by a user from among the one or more UI widgets;
    identifying control information corresponding to the identified UI widget; and
    transmitting the identified control information to the first external electronic device.

6. The method of claim 1, further comprising:
    identifying a usage frequency of each of a plurality of external electronic devices during a preset period;
    identifying at least one external electronic device including a usage frequency of a threshold value or greater among the plurality of external electronic devices, based on an identification result; and
    selecting one of the at least one external electronic device as the first external electronic device.

7. The method of claim 1, further comprising:
    receiving a user input to request generation of an application for controlling the first external electronic device;
    establishing a connection with the first external electronic device specified based on the user input; and
    obtaining the first device information and the first control information from the first external electronic device, based on the established connection.

8. The method of claim 1, wherein the one or more functions comprise one or more functions including a usage frequency of a threshold value or greater among controllable functions of the first external electronic device.

9. The method of claim 1, further comprising:
    obtaining second device information about a second external electronic device and second control information for controlling one or more functions provided by the second external electronic device from the second external electronic device; and
    reforming the first application into a second application associated with the second external electronic device, based on the second device information about the second external electronic device and the second control information about the second external electronic device.

10. The method of claim 9, wherein the reforming of the first application into the second application associated with the second external electronic device comprises:
obtaining second icon information corresponding to the second device information about the second external electronic device using the artificial intelligence model;
generating a second icon as an icon of the second application based on the second icon information;
displaying the second icon into which the first icon is reformed; and
reforming the one or more UI widgets to one or more UI widgets to be displayed when the second application is executed by changing third control information corresponding to the one or more UI widgets to the second control information about the second external electronic device.

11. An electronic device comprising:
a display;
a communication interface; and
at least one processor configured to be functionally connected to the display and the communication interface, wherein the at least one processor is configured to:
obtain first device information about a first external electronic device and first control information for controlling one or more functions provided by the first external electronic device from the first external electronic device,
obtain first icon information corresponding to the obtained first device information using an artificial intelligence model, generate a first icon based on the obtained first icon information, display the generated first icon as an icon of a first application associated with the first external electronic device,
obtain user interface (UI) information corresponding to the obtained first control information using the artificial intelligence model,
generate one or more UI widgets to be displayed when the first application is executed based on the obtained UI information,
obtain layout information about the one or more UI widgets using the artificial intelligence model, and
display the one or more UI widgets at a position corresponding to the obtained layout information when the first application is executed.

12. The electronic device of claim 11, wherein the at least one processor is configured to obtain, as the first device information, at least one of uniform resource identifier (URI) information for accessing the first external electronic device and name information about the first external electronic device.

13. The electronic device of claim 11, wherein the at least one processor is configured to obtain the first device information and the first control information from the first external electronic device using a device-to-device (D2D) communication method.

14. The electronic device of claim 11, wherein the at least one processor is configured to:
obtain an artificial intelligence widget from a cloud server, and
use the artificial intelligence model included in the artificial intelligence widget.

15. The electronic device of claim 11, wherein the at least one processor is configured to:
identify a UI widget selected by a user from among the one or more UI widgets,
identify control information corresponding to the identified UI widget, and
transmit the identified control information to the first external electronic device.

16. The electronic device of claim 11, wherein the at least one processor is configured to:
identify a usage frequency of each of a plurality of external electronic devices during a preset period,
identify at least one external electronic device including a usage frequency of a threshold value or greater among the plurality of external electronic devices, based on an identification result, and
select one of the at least one external electronic device as the first external electronic device.

17. The electronic device of claim 11, wherein the at least one processor is configured to:
receive a user input to request generation of an application for controlling the first external electronic device,
establish a connection with the first external electronic device specified based on the user input, and
obtain the first device information and the first control information from the first external electronic device, based on the established connection.

18. The electronic device of claim 11, wherein the at least one processor is configured to obtain control information for controlling the one or more functions including a usage frequency of a threshold value or greater among controllable functions of the first external electronic device.

19. The electronic device of claim 11, wherein the at least one processor is configured to:
obtain second device information about a second external electronic device and second control information for controlling one or more functions provided by the second external electronic device from the second external electronic device, and
reform the first application into a second application associated with the second external electronic device, based on the second device information about the second external electronic device and the second control information about the second external electronic device.

20. The electronic device of claim 19, wherein the at least one processor is configured to:
obtain second icon information corresponding to the second device information about the second external electronic device using the artificial intelligence model,
generate a second icon as an icon of the second application based on the second icon information,
display the second icon into which the first icon is reformed, and
reform the one or more UI widgets to one or more UI widgets to be displayed when the second application is executed by changing third control information corresponding to the one or more UI widgets to the second control information about the second external electronic device.

* * * * *